(12) United States Patent
Haller

(10) Patent No.: US 6,802,695 B2
(45) Date of Patent: Oct. 12, 2004

(54) TURBINES AND THEIR COMPONENTS

(75) Inventor: Brian Robert Haller, Market Resan (GB)

(73) Assignee: Alstom (Switzerland) LTD, Baden (CH)

(*) Notice: Subject to any disclaimer, the term of this patent is extended or adjusted under 35 U.S.C. 154(b) by 38 days.

(21) Appl. No.: 10/348,533

(22) Filed: Jan. 21, 2003

(65) Prior Publication Data

US 2003/0215330 A1 Nov. 20, 2003

(30) Foreign Application Priority Data

Jan. 18, 2002 (GB) .............................. 0201061

(51) Int. Cl.⁷ ................................................ F01D 5/14
(52) U.S. Cl. ................... 416/223 R; 416/243; 416/228
(58) Field of Search ............................ 416/223 R, 243, 416/228, 248, DIG. 2, DIG. 5; 415/191, 192

(56) References Cited

U.S. PATENT DOCUMENTS

| | | | | |
|---|---|---|---|---|
| 4,431,376 A | * | 2/1984 | Lubenstein et al. | ...... 416/223 A |
| 5,342,170 A | * | 8/1994 | Elvekjaer et al. | ........... 415/192 |
| 5,480,285 A | * | 1/1996 | Patel et al. | ............. 416/223 A |
| 5,779,443 A | * | 7/1998 | Haller et al. | ................ 415/191 |
| 6,099,249 A | * | 8/2000 | Hashimoto | ............... 415/199.4 |
| 6,270,315 B1 | | 8/2001 | Greim et al. | |
| 6,312,219 B1 | * | 11/2001 | Wood et al. | ................. 415/191 |
| 6,398,489 B1 | * | 6/2002 | Burdgick et al. | ........... 415/115 |

FOREIGN PATENT DOCUMENTS

GB          2 359 341 A        8/2001

* cited by examiner

Primary Examiner—Edward K. Look
Assistant Examiner—James M McAleenan
(74) Attorney, Agent, or Firm—Kirschstein, et al.

(57) ABSTRACT

An axial flow gas turbine comprises a turbine and a turbine exhaust section. The turbine comprises a turbine nozzle containing a low pressure turbine stage having an annular row of stator vanes (V2) followed in axial succession by an annular row of rotor blades (B2). The low pressure turbine stage is characterized by the following parameters: the ratio of vane airfoil pitch to vane airfoil axial width (P/W) at the root end of the vane airfoil (V2) is in the region of 1.0 to 1.2, preferably about 1.12; the ratio of blade airfoil pitch to blade airfoil axial width (P/W) at the root end of the blade airfoil (B2) is in the region of 0.6; the ratio of blade diameter at the tip end of the blade airfoil to blade diameter at the root end of the blade airfoil (blade tip/hub diameter ratio) is in the region of 1.6–1.8, preferably about 1.72; and the ratio of the axial length of the exhaust section to the blade airfoil height (L/H) is no greater than a value in the region of 4:1, preferably 3:1. These parameters are subject to a permitted variation of up to ±10%, preferably up to ±5%. Dimensions of example airfoils are given and are scaleable to produce turbines of any chosen power.

25 Claims, 6 Drawing Sheets

TURBINES AND THEIR COMPONENTS

FIELD OF THE INVENTION

The present invention relates to axial flow turbines and in particular to aerodynamic design aspects of such turbines for improved efficiency. The invention relates, more specifically, to airfoil, nozzle and exhaust duct shape and configuration.

BACKGROUND TO THE INVENTION

Axial flow gas turbine engines, for example, normally comprise a compressor, a combustion section, and a turbine section. To these are added intake and exhaust systems. Atmospheric air is drawn into the compressor through the intake system and is then passed at high pressure into the combustion section, where it is mixed with fuel and the mixture ignited to create a working fluid in the form of a pressurized hot gas. This passes to the turbine section where its energy is converted by the turbine blades into useful work. The temperature and pressure of the working gas is now considerably diminished, and is discharged to atmosphere by the exhaust system.

The turbine section consists of rotor blades and stator blades. To distinguish between the two, unless the context otherwise dictates, the rotor blades will be referred to as 'blades' and the stator blades will be referred to as 'vanes'. The blades and vanes form a series of axially successive annular rows. Each blade is attached to a turbine rotor disc or drum via a portion known as the root. The disc or drum is mounted on a rotor shaft whose centre line defines the rotational axis of the turbine. The vanes are fixed, typically to an inner drum and/or an outer turbine casing, such that they alternate with the rotor blades to form paired rows of vanes/blades. Each such pair of rows forms what is known as a turbine stage, in which the vane is followed in axial flow succession by the blade. A turbine may comprise one or more stages, and it is common for the turbine to comprise high pressure and low pressure sections, each section containing one or more stages.

The blade rows extract energy from the working fluid and transfer it to the turbine rotor, whereas the vanes smooth the passage of the working fluid and direct it at an optimum outlet angle so as to meet the rotating blades at the designed angle. In this way energy transfer is carried out as efficiently as possible.

Vanes and blades of axial flow turbines have a cross-section profile of the generic airfoil type and bear a strong visual likeness one to another, notwithstanding scale differences usually dependent upon engine size. However, on inspection it is found there are measurable differences of airfoil profiles, not only between engines of different make and type, but also between turbine stages of the same engine. Further, such differences may have significant effect on turbine efficiency. Similarly, there are differences in other aspects of turbine stage design which alone or in combination also have an effect. Small differences in such design features, which may appear minimal or unimportant to those unskilled in the art, may in fact have a significant effect on turbine stage performance. Turbines currently operate at very high efficiency values, the best of which are in the region of 90%. At this level of efficiency, it is very difficult to make improvements, so even improvements as small as 1 or 2% are regarded as significant.

In part, the present invention incorporates and improves upon previous teachings in respect of so called "Controlled Flow" principles of airfoil design by the present inventor and others. In particular, see United Kingdom Patent No. GB 2 295 860 B, and United Kingdom Patent No. GB 2 359 341 B. These two prior patents should be read to gain a full appreciation of the present invention. Other patents showing similar principles include U.S. Pat. No. 5,326,221 to Amyot, et al., (for steam turbines) and U.S. Pat. No. 4,741,667 to Price, et al., (for gas turbines).

In an improved turbine according to the present invention, efficiencies as high as 93% may now be possible. The invention also facilitates a design that is more compact, thereby reducing its footprint size and making potentially large savings in terms of space and therefore cost.

To aid understanding it will be useful to include at this stage some definitions of terms or expressions utilized in the following description.

In axial flow turbines, the "root" of a blade is that radially inner part which is attached to the rotor structure, whereas the radially outer opposite portion is the "tip". For the purpose of describing the present invention, the radially inner ends of the airfoils of both the vanes and the blades will be called the root sections and the radially outer ends of their airfoils will be called the tip sections.

Airfoil cross-sectional profiles will be defined by reference to an x,y co-ordinate system as illustrated in FIG. 7 of the accompanying drawings, where 'x' is the axial co-ordinate as measured along the rotational axis of the turbine and 'y' is the tangential co-ordinate as measured along the instantaneous direction of motion of the rotor blade. To reduce the bulk of the Tables incorporated herein, airfoil cross-sectional profiles will be numerically defined in x,y co-ordinates at only three radial stations along the radial co-ordinate 'z', these being profiles at the airfoil root end, mid-height and tip end. However, profiles between these stations can be readily obtained by those skilled in the art by a process of interpolation and smoothing.

The expression $AN^2$ represents the product of the area A of the annulus swept by the LP turbine blade airfoils at the outlet of the stage, multiplied by the square of the rotational speed N of the blades. The annulus area itself is defined as the difference in area of the circles delineated by the inner and outer radii of the blade airfoils. Exemplary numerical values for typical prior art turbines and a turbine produced according to the present invention will be given in the appropriate section of the following description.

The pitch dimension of a row of blades or vanes is the circumferential distance from one airfoil trailing edge to the adjacent airfoil trailing edge in the same row at a specified radial distance from the root end of the airfoil.

The axial width (W) of an airfoil is the axial distance between its leading and trailing edges, as measured along the rotational axis of the turbine. The pitch/width ratio (P/W) at the root perimeter is an important parameter which influences the efficiency of the blade or vane row, the number of blades or vanes (and therefore the cost) and the circumferential width of the rotor disc-post (i.e., it affects rotor disc stressing). In this connection, note that gas turbines typically operate at very high rotational speeds (for example 17,400 rpm). This can generate very high centrifugal forces, reaching 110,000G at the rotor tips. Both blades and vanes are also subject to very high temperatures. Turbines must be designed to withstand the stresses imposed by these conditions of use.

The tip/hub diameter ratio is an indicator of the comparative radial length of the blades compared to the overall diameter of the turbine. Its significance is that it represents the annular area available for passage of the working fluid.

Turbomachinery efficiencies compare the actual changes in the fluid between inlet and exit with the theoretical best 'reversible' change. Also, at the exit from the last stage, either total or static conditions can be used. This gives either 'Total to Total' or 'Total to Static' efficiency. The difference is the exit kinetic energy of the gas.

In concert with new airfoil designs, a turbine according to the invention includes an improved turbine nozzle shape.

Consider a gas turbine having a single high pressure (HP) stage followed by a low pressure (LP) section, the low pressure section including a plurality of individual stages. Known types of last LP stage discharging into an exhaust system tend to generate a non-uniform leaving energy and stagnation pressure profile which is detrimental to the overall performance of the last stage and exhaust. Hence, it would be advantageous if the last LP stage could generate a stagnation pressure profile into the exhaust which is nearer the ideal, this profile being virtually constant across the span and increasing slightly towards the tip.

The exhaust of a gas turbine is the final stage of the flow path expansion and is responsible for efficiently discharging the spent working fluid from the turbine into the atmosphere. Current turbine exhaust designs achieve 60% pressure recovery with an exhaust having a length (L) to last LP blade height (H) ratio (L/H) approximating to a figure between nine and ten. In this context 'length' represents the axial length of the exhaust from the final low-pressure stage to the downstream end wall of the turbine, whereas 'height' represents the radial height of the last blade airfoil in the low-pressure stage of the turbine. As previously mentioned, the footprint of a turbine is a measure of the cost of its installation. For example, current cost for a turbine installation on an oilrig (say) is £80,000 (British Pounds) per square meter. Hence, it is desirable if a compact design can be achieved.

The design and constructional features of the various aspects of the invention and their advantages over prior turbine designs will now be explained with reference to the following sections of the specification.

SUMMARY OF THE INVENTION

The invention comprises, in a first aspect, an gas axial flow gas turbine comprising in axial succession a turbine and a turbine exhaust section, the turbine comprising a turbine nozzle containing a low pressure turbine stage having an annular row of stator vanes followed in axial succession by an annular row of rotor blades, wherein the low pressure turbine stage is characterized by the following parameters:

the ratio of vane airfoil pitch to vane airfoil axial width at the root end of the vane airfoil (P/W) is in the region of 1.0 to 1.2;

the ratio of blade airfoil pitch to blade airfoil axial width at the root end of the blade airfoil (P/W) is in the region of 0.6;

the ratio of blade diameter at the tip end of the blade airfoil to blade diameter at the root end of the blade airfoil is in the region of 1.6–1.8; and the ratio of the axial length of the exhaust section to the blade airfoil height (L/H) is no greater than a value in the region of 4:1;

said parameters being subject to a predetermined amount of variation.

Preferably, the above ratio of vane airfoil pitch to vane airfoil axial width at the root end of the vane airfoil (P/W) is about 1.12 and the above ratio of blade diameter at the tip end of the blade airfoil to blade diameter at the root end of the blade airfoil is about 1.72. The ratio of the axial length of the exhaust section to the blade airfoil height (L/H) is preferably about 3:1. The predetermined level of variation may be up to ±10%, preferably ±5%.

The turbine stage vane and blade airfoil cross-sectional profiles at the root, mid-height and tip may be as defined according to Tables 1A to 1C and Tables 2A to 2C respectively, subject to said predetermined level of variation. The values listed in these tables may be scaled by the application of suitable scaling factors (as known per se) to obtain turbines able to deliver larger or smaller powers.

The configuration of the turbine nozzle may be as defined herein by reference to Table 3 and FIG. 3; and the exhaust section configuration may be as defined herein by reference to Table 4 and FIG. 6. To match airfoil configurations which have been scaled from Tables 1A to 2C, Tables 3 and 4 may be utilized to define the respective shapes of the turbine nozzle and exhaust section, their actual dimensions being adjusted to be commensurate with the scaled x, y and z values of the vane and blade airfoils, as appropriate.

The blade airfoils may be hollow, to reduce weight. Preferably, they taper so as to have a smaller axial width at their tips than at their root ends. However, the vane airfoils should preferably taper in the opposite direction so as to have a larger axial width at their tips than at their root ends.

BRIEF DESCRIPTION OF THE DRAWINGS

Exemplary embodiments of the present invention will now be described with reference to the following drawings, in which.

DETAILED DESCRIPTION OF EMBODIMENTS OF THE INVENTION

Figure 3:
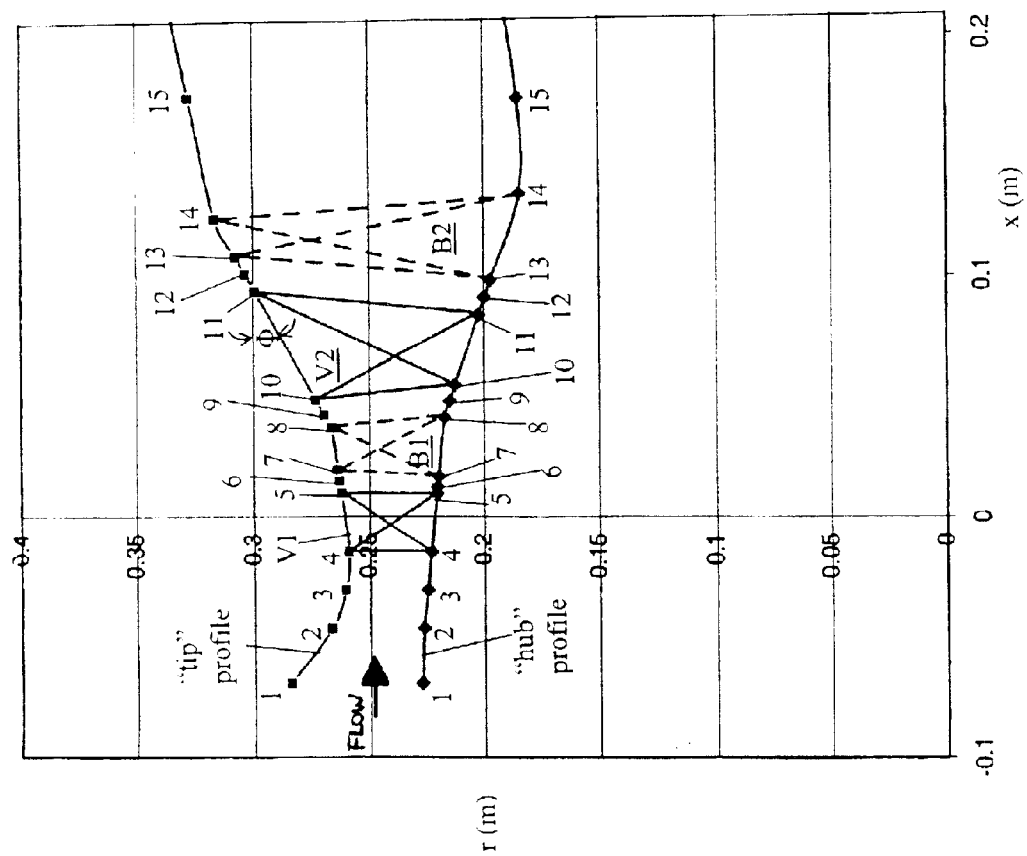
FIG. 3 is a diagrammatic axial section through the flow-path of an HP and LP turbine in accordance with the present invention, as specified below in Table 3.

The flow path of an exemplary turbine nozzle in accordance with the invention is diagrammatically illustrated in FIG. 3 in terms of a plot of axial (x) against radial (r) co-ordinates in meters. The flow path contains an HP turbine stage, comprising a row of nozzle guide vane (NGV) airfoils V1 followed by a row of rotor blade airfoils B1, and an LP turbine stage, comprising a row of nozzle guide vane (NGV) airfoils V2 followed by a row of rotor blade airfoils B2. Vane airfoils are shown in solid lines and blade airfoils are shown in dashed lines. The turbine gas flow arrives at the HP NGV's V1 from the combustor and is discharged from the LP rotor blades B2 into the exhaust section of the gas turbine. The nozzle's flow path is bounded by a radially outer "tip profile" and a radially inner "hub profile". Also shown are inner and outer quasi-orthogonal station identifiers 1 to 15 on the hub and tip profiles that correspond to stations 1 to 15 in Table 3. Table 3 specifies the configuration of the turbine nozzle in terms of x,r co-ordinates in meters at the "hub" and "tip", respectively.

The following description is conveniently divided into three parts, relating respectively to the LP turbine blade B2, its preceding nozzle guide vane V2, and the exhaust system following the blade B2.

Part 1—Turbine Blade

To obtain increased efficiency, turbine designers aim to obtain a static pressure at the exit of the blade which is as low as possible. This is achieved when the exit velocity of the working fluid is likewise reduced. The leaving energy of the working fluid is proportional to the square of the velocity of the fluid. The present invention enables the leaving energy to be in the region of 50% less than known turbines. The overall total-to-total efficiency of the turbine is in the region of 93%. The overall total-to-static efficiency of the last LP stage and exhaust is 5% higher than current designs. This is of great significance to the fuel burn of the engine.

As previously mentioned, for maximum efficiency, the LP rotor blade should generate a stagnation pressure profile into the exhaust system which is virtually constant across the span, but increases slightly towards the tip. The stagnation pressure profile is of course dependent on the gas outlet velocity angle distribution and the present invention achieves a more even distribution than prior art designs.

Figure 1:
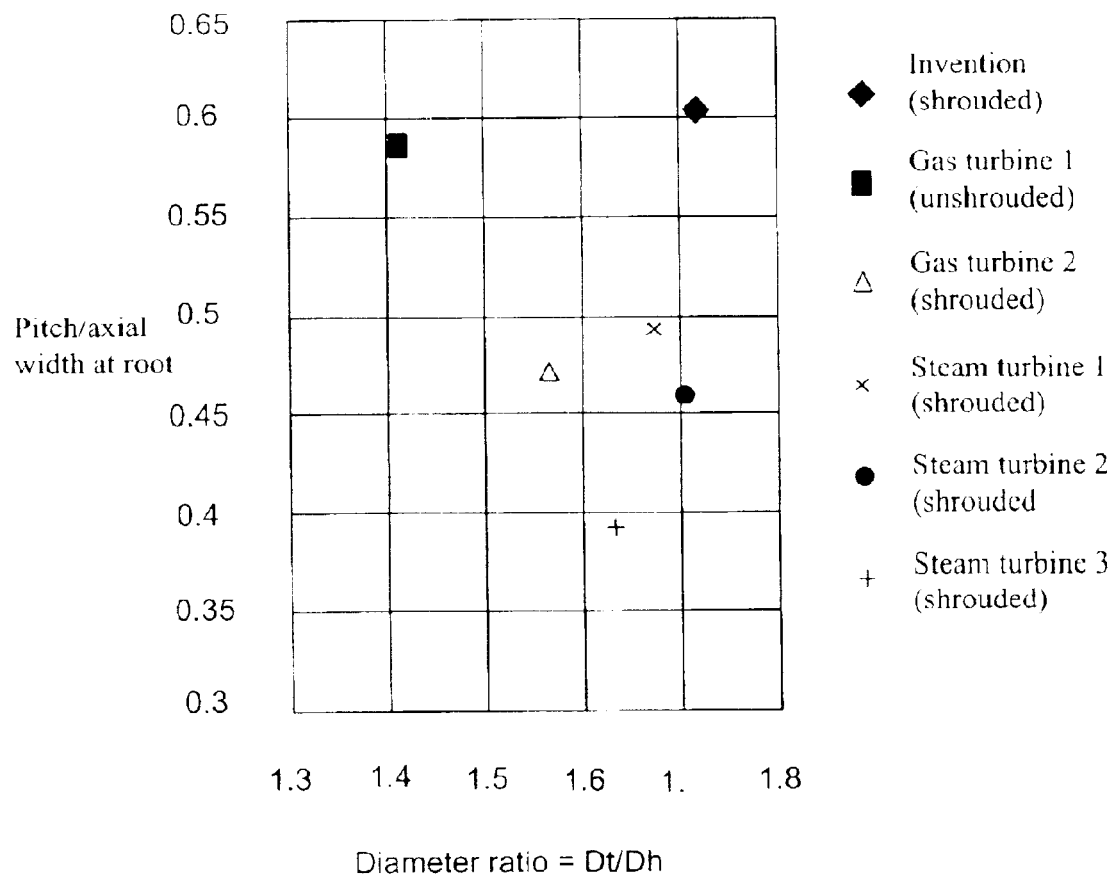
FIG. 1 is a graphical plot of pitch/root ratio for rotor blade airfoil root sections, showing an advantage of the invention.
Figure 7:
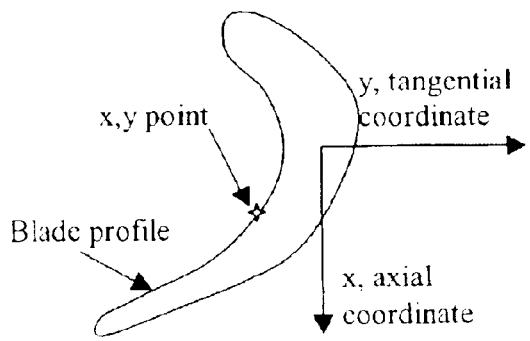
FIG. 7 illustrates the x, y co-ordinate system used in Tables 1A to 2C to define airfoil cross-sectional profiles.

The present invention achieves improved operating parameters. For example, the pitch/root axial width ratio (P/W) can be increased to a value approximating 0.6 whereas known designs have values in the range 0.4 to 0.45 (for shrouded turbine blades). The comparison is shown in the comparative performance plot in FIG. 1, where a shrouded turbine blade in accordance with the invention has a better P/W ratio than a prior art unshrouded turbine blade. Similarly, the tip/hub diameter ratio can now reach values in the region of 1.6 to 1.8 (preferably 1.72) compared to previous designs where the ratio reached only 1.4 or thereabouts.

A significant advantage of the longer blade length, measured in the radial direction, is that the annular area can be correspondingly increased. This advantage has a consequential effect on the $AN^2$ parameter. This previously was in the range 45 to $50 \times 10^{12}$ $mm^2$ $rpm^2$, at least as regards turbines that worked reliably without excessive cooling at the root, thereby lowering engine performance. By contrast, turbines according to the present invention can now achieve $AN^2$ values in the region of $60-63 \times 10^{12}$ $mm^2$ $rpm^2$.

Shrouded turbine rotor blades have their tips interconnected so as to reduce over-tip leakage and blade vibration. The present invention enables the advantages of high P/W and tip/hub ratios to be achieved even with shrouded blades. Also, the number of blades can be reduced, for example to 53, compared to known equivalent designs utilizing 71 blades or more. Each blade preferably has a two- or three-lobed root. An incidental advantage is that the lower number of blades means that there is a direct line of sight between adjacent blades in a row. The significance of this is that finish assembly grinding can be carried out in a single operation rather than having to approach the blade from one or the other side. This has the dual advantage of simplifying manufacture and reducing manufacturing costs.

Another means to reduce the blade weight and centrifugal stressing on the blade roots is to make the LP rotor blade hollow. This would enable a further increase in $AN^2$ to be achieved beyond the level of $63 \times 10^{12}$ $mm^2$ $rpm^2$. The thickness of the walls of the airfoil can be tapered with reduced thickness from the root to the tip to carry the centrifugal stress.

Figure 2:
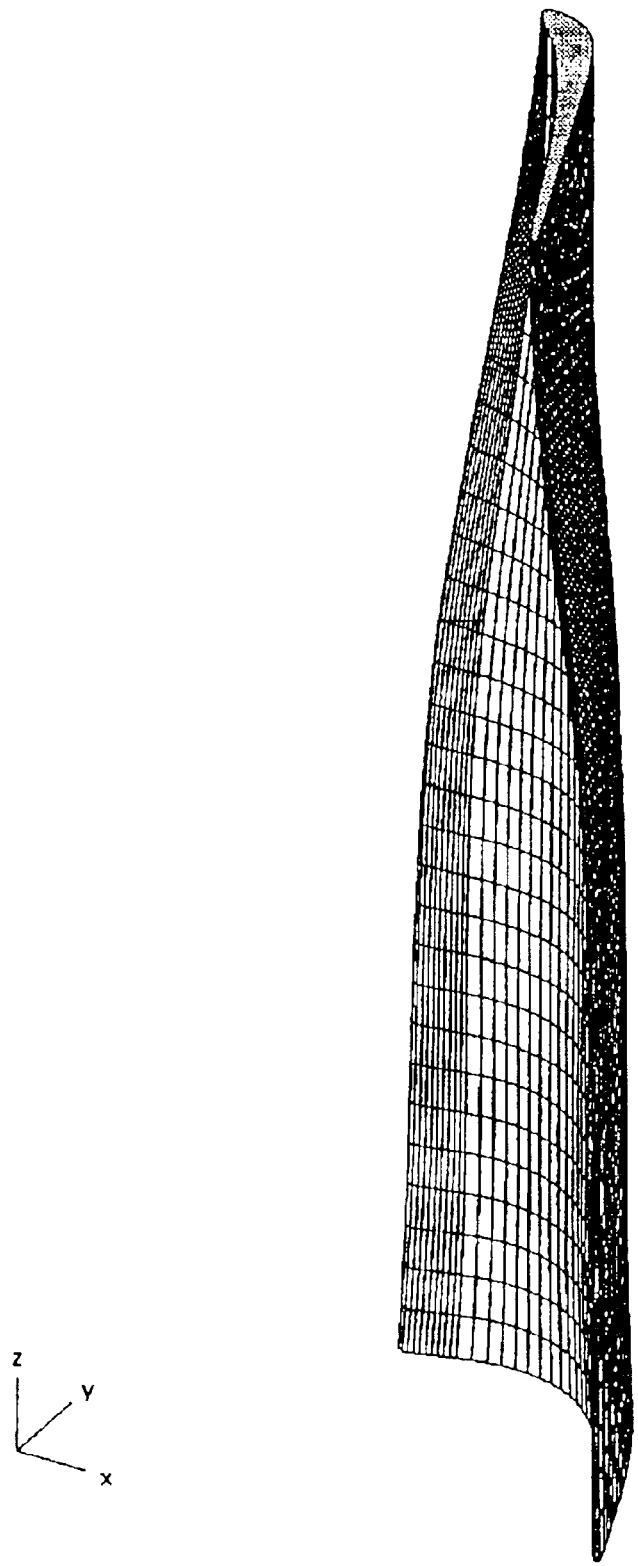
FIG. 2 is an isometric 3D graphical representation of a rotor blade airfoil in accordance with the present invention, as specified below in Tables 1A to 1C.

A particular implementation of a turbine blade according to the invention is defined in Tables 1A to 1C in terms of three sets of x, y co-ordinates specifying sections through the airfoil profile taken in the z (radial) direction at successive stations at its root end, at mid-height, and at the tip, respectively. An isometric 3D graphical view of the whole blade is shown in FIG. 2.

The rotor sections may be "stacked" on a radial line through the centers of gravity of each section, but advantageously the sections are displaced slightly so as to (a) balance the gas bending stress and (b) minimize the centrifugal stresses in the blade.

Part 2—L. P. Turbine Nozzle Guide Vane

Figure 4:
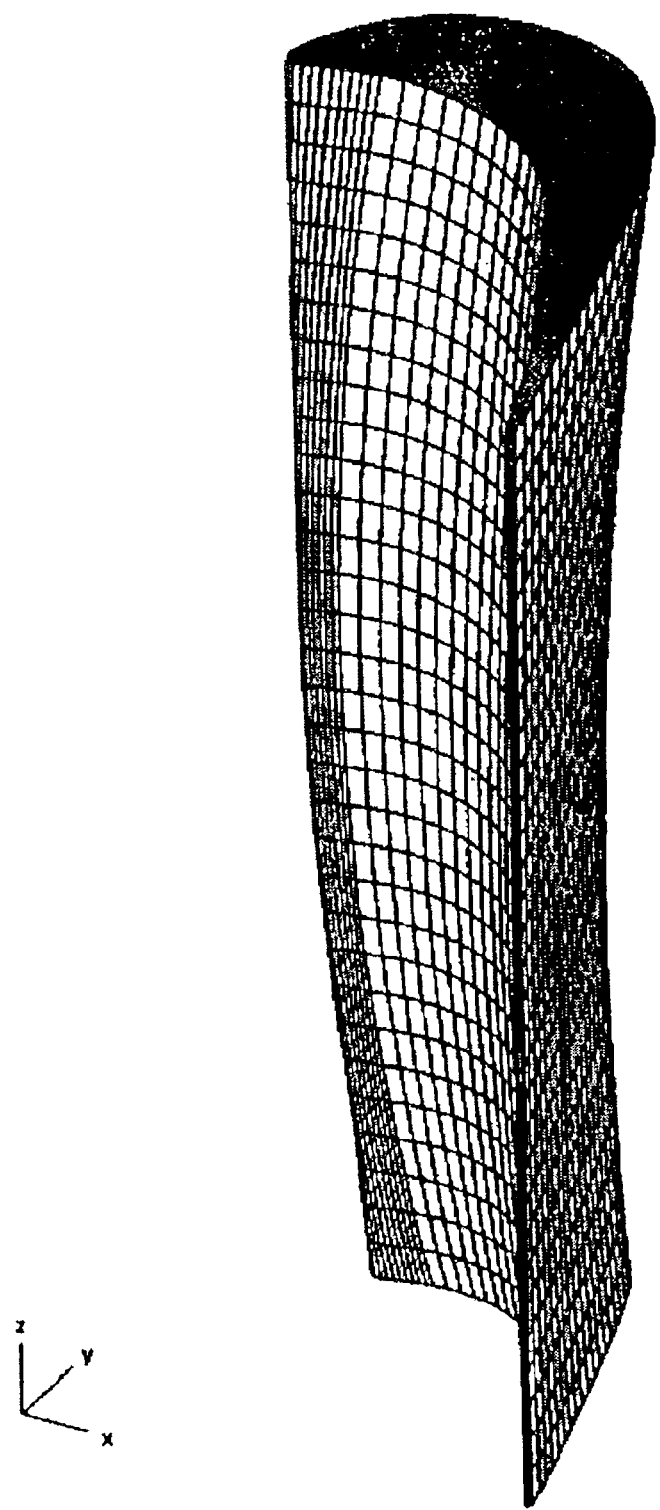
FIG. 4 is an isometric 3D graphical representation of a guide vane airfoil in accordance with the present invention, as specified below in Tables 2A to 2C.

In the same manner as for the blade airfoils, FIG. 4 is a graphical 3D representation of an isometric view of an example of an LP NGV airfoil according to the invention. Its profiles at its root, mid-height and tip are as defined in Tables 2A to 2C at the end of this specification.

Generalized features of the vane construction and arrangement include the following.

(a) Tapering of the airfoil to control streamwise flow over its tip end profile. This is preferably achieved by increasing the axial width of the airfoil from the root towards the tip. An example of this is shown diagrammatically in FIG. 3 and is more rigorously defined by the co-ordinate values in Table 3. It will easily be seen from FIG. 3 that in the axial-radial (x, r) meridianal plane, the leading and trailing edges of the vane V2 lean respectively forward and rearward in the x direction, producing the required taper.

(b) Measured in cylindrical polar co-ordinates (r, θ) there is a positive lean of the vane's trailing edge so that a vector normal to the vane's pressure surface has a radially directed component. This raises the stage root reaction, while decreasing the vane airfoil outlet Mach number at the root and increasing it at the tip. In the example illustrated in FIGS. 3 and 4 and defined in Tables 2A to 2C, the trailing edge lean angle is +10 degrees.

(c) The flare angle Φ of the outer annulus wall at the vane airfoil tip is within the range of 25 degrees to 35 degrees and preferably around 30 degrees. As illustrated in FIG. 3, the flare angle Φ is measured in the axial-radial (x, r) meridianal plane and is the angle subtended between the outer wall (tip profile) of the gas annulus and the axial direction x.

(d) The ratio of the pitch (vane-to-vane distance) to the axial width of the airfoil at the root end (P/W) can be increased to a value in the region of 1.0 to 1.2, whereas known designs have values in the range 0.7 to 0.75. Hence, the number of vanes in the row can be substantially reduced by a factor in the region of one third. In the example illustrated in FIGS. 3 and 4 and defined in Tables 2A to 2C, P/W=1.21 and the number of vanes V2 per row was reduced to 36 from the 52 used in a previous design.

The following Table A compares a known configuration with a configuration according to the invention and shows the enhanced pitch/width ratio achieved for the low pressure nozzle guide vane (LP NGV) and the low pressure rotor.

TABLE A

| Airfoil row | No. of airfoils | (P/W) root | (H/W) root |
|---|---|---|---|
| *Known design:* | | | |
| HP NGV | 40 | 1.16 | 0.935 |
| HP rotor blade (shrouded) | 61 | 0.7 | 1.23 |
| LP NGV | 52 | 0.73 | 2.16 |
| LP rotor blade (unshrouded) | 61 | 0.547 | 3.09 |
| Total number of airfoils = | 214 | | |
| *Invention design:* | | | |
| HP NGV | 36 | 1.6 | 1.70 |
| HP rotor blade (shrouded) | 61 | 0.95 | 2.01 |
| LP NGV | 36 | 1.21 | 3.32 |
| LP rotor blade (shrouded) | 53 | 0.614 | 3.72 |
| Total number of airfoils = | 186 (−13%) | | |

Another advantage of the invention is that the same number of vanes is used for the HP and LP NGV's. Hence, the vanes can be indexed circumferentially relative to one another, such that the wakes from HP NGV's fall on the optimum position in the LP NGV passages (i.e., mid-pitch), to obtain the highest LP stage efficiency. If the wakes from the HP NGV fall upon the leading edges of the LP NGV's then they cause earlier transition of the airfoil surface boundary layers and higher loss.

Part 3—Exhaust System

An exhaust design in accordance with the present invention may enable up to a 65% pressure recovery, compared to 60% in the prior art, and the length/height ratio L/H may be reduced to a value in the region of 3 compared to prior art values in the region of 9 to 10. This can considerably reduce the footprint of the overall turbine design, thereby reducing capital costs in the location where the turbine is installed.

Figure 5:
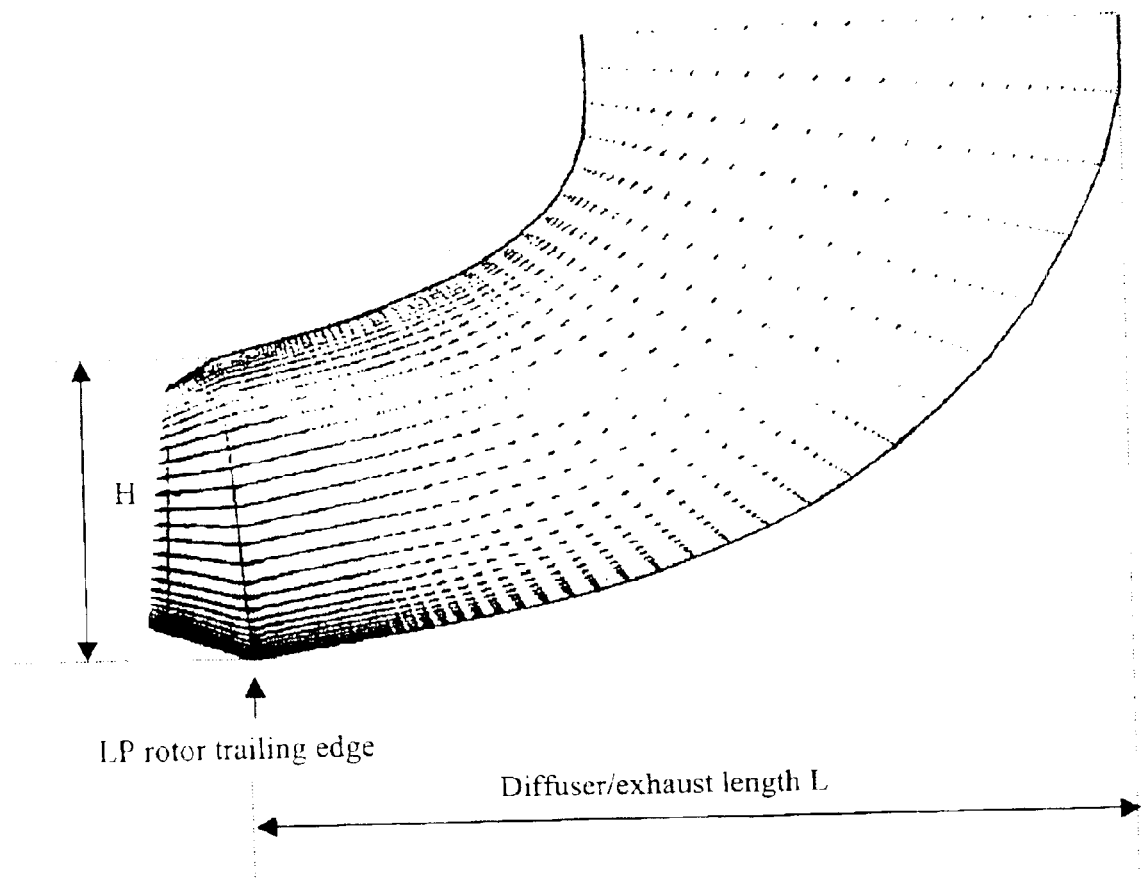
FIG. 5 is a representation of vector flow paths in the exhaust system.
Figure 6:
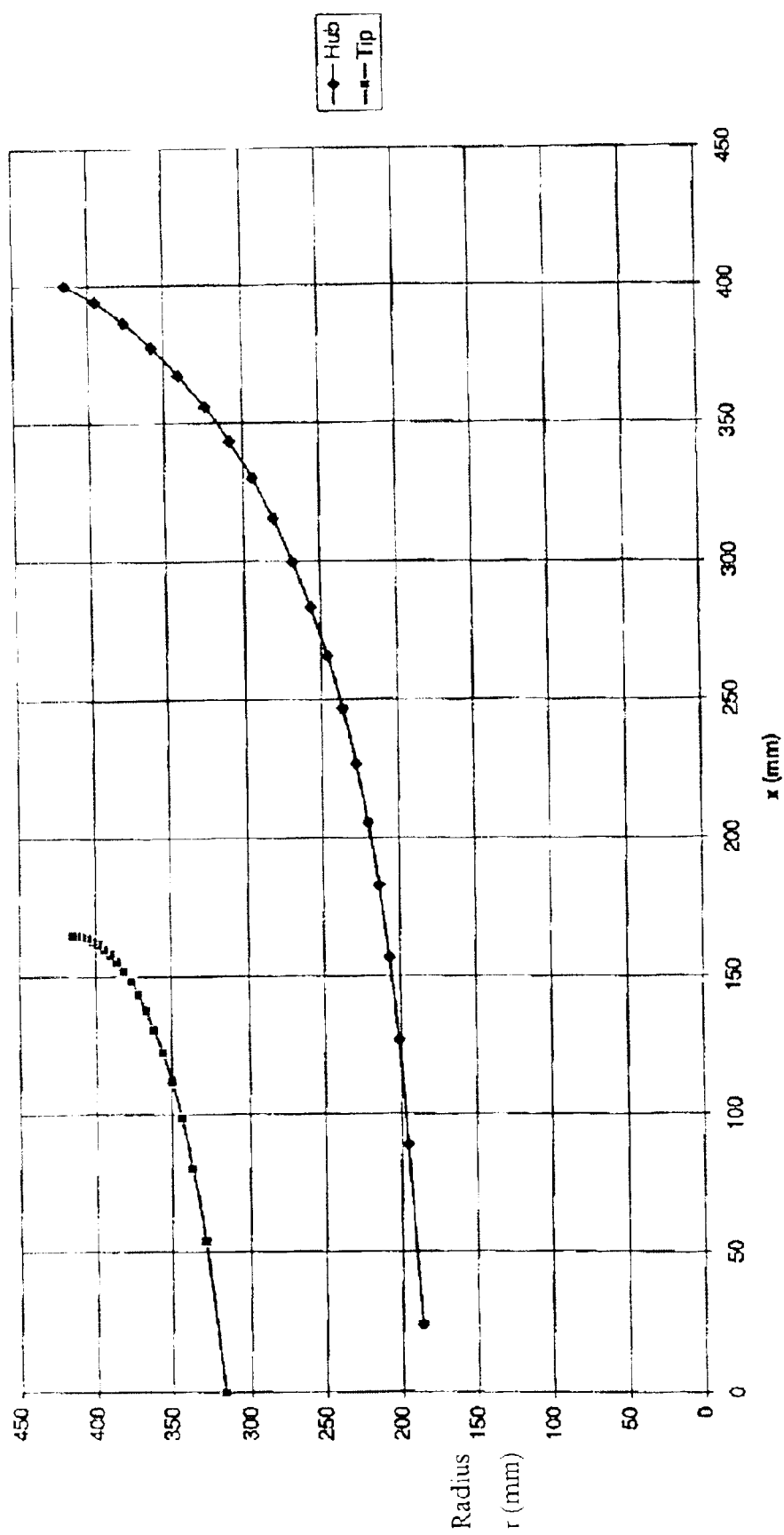
FIG. 6 is a graphical plot s of the exhaust section of FIG. 5.

The design philosophy employed in deriving the particular shape illustrated in FIGS. 3, 5 and 6, involved a process in which each length of exhaust was taken and a series of lip shapes (i.e., turbine exhaust casing profiles), with constant gas velocity, was calculated to find the lip shape that gave the lowest velocity ratio. The velocity ratio is a measure of the velocity of the working fluid on the lip compared to the outlet velocity on the last low-pressure stage of the turbine. Once the optimum shape was thus calculated the overall shape of the complete exhaust was thereby determined.

Referring to FIG. 5, a graphical representation of the flow vectors in the exhaust section shows the blade height H, the line of the LP rotor trailing edge and the diffuser/exhaust length L. Flow vectors are shown as broken lines emanating from the trailing edge of the last low pressure stage and terminating in a downstream end wall. The parameters defining the shape of the exhaust section are shown in Table 4, where again "x" is the axial distance along the exhaust and "r" is the radial distance from the axis of the turbine. "xlip" and "rlip" are the x, r co-ordinates of the exhaust casing profile, (i.e., the outer radius of the gas annulus); "xhub" and "rhub" are the x, r co-ordinates of the gas annulus inner radius; and "xlip,corr" and "xhub,corr" are the axial offset corrections which should be added to the xlip and xhub co-ordinates to match the LP rotor blade discharge flow. The co-ordinates are given in millimeters. A plot of the (x, r) co-ordinates of the exhaust section is shown in FIG. 6.

The normal design for this type of axial/radial turbine exhaust requires the addition of internal bracing struts in order to stabilize what is otherwise a long exhaust path. The shorter path of the present invention enables those struts to be eliminated. This has the further advantage of reducing the effect on the flow from having extraneous devices in the flow path within the exhaust. The exhaust hub casing can then be supported from the back wall of the turbine casing.

Other Constructional Considerations

In the data provided in this specification as a means of defining airfoil cross-sectional profile shapes, path lengths and the like, the range of values should be understood to be within ±10% of the nominal data values quoted, preferably ±5%. For example, for a chord of length 30 mm the x and y dimensions may vary by ±3 mm, preferably ±1.5 mm. Similarly, for a high pressure root radius at outlet of 217.6 mm, the permissible variation would be about ±20 mm, preferably about ±10 mm.

The exemplary embodiment of the invention disclosed in the following Tables and Figures is for a turbine having a power of about 5 MW. For scaling purposes the x-y co-ordinates of Tables 1A to 2C may be multiplied by a predetermined number or scaling factor to achieve similar aerodynamic performance from either larger or smaller vanes and blades. It will be known to those skilled in the art that simple linear scaling of vanes and blades does not indicate similar linear scaling of, for example, engine power (which would, in comparison, scale to the square). Nevertheless, with appropriate scaling, the airfoil section profile shapes and angles described in the Tables may be used for any size gas turbine engine. For example, it may be used in gas turbines with a power output ranging from 5 to 300 MW or more.

Further, it should be noted that the invention is not limited to the particular airfoil section profile shapes and angles described herein. Because parameters of the present design have been quoted in terms of ratios, the actual sizes of the component parts of a turbine may be scaled without any loss of the significant advantages achievable by the present invention. It is of further importance to note that although airfoil profiles have been shown and discussed in connection with a particular orientation, the concepts of the present invention are applicable to turbines which have an opposite sense of rotation compared to those illustrated in this particular specification. In other words, the invention is not restricted to any particular handing of the various profiles described. Moreover, blade and/or vane construction can be hollow, thereby making even more weight and therefore cost savings.

It will be understood that each of the elements described above, or two or more together, also may find a useful application in other types of constructions differing from the types described above.

While the invention has been illustrated and described as improvements in turbines and their components, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

TABLE 1A

TURBINE BLADE CONFIGURATION
LP rotor blade root, z value through Center of Gravity = 182.395 mm
Pitch = 21.8570 mm

| x (mm) | y (mm) |
|---|---|
| 21.16230 | −26.87563 |
| 21.15845 | −26.98115 |
| 21.12386 | −27.08092 |
| 21.06157 | −27.16617 |
| 20.97703 | −27.22943 |
| 20.87766 | −27.26516 |
| 20.77219 | −27.27020 |
| 20.66987 | −27.24413 |
| 20.57968 | −27.18923 |
| 20.50952 | −27.11031 |
| 20.48397 | −27.06395 |
| 20.11050 | −26.25416 |
| 19.72956 | −25.44786 |
| 19.34170 | −24.64486 |
| 18.94735 | −23.84504 |
| 18.54692 | −23.04824 |
| 18.14077 | −22.25433 |
| 17.72922 | −21.46322 |
| 17.31247 | −20.67483 |
| 16.89008 | −19.88944 |
| 16.46128 | −19.10755 |
| 16.02522 | −18.32967 |
| 15.58109 | −17.55638 |
| 15.12821 | −16.78818 |
| 14.66586 | −16.02565 |
| 14.19321 | −15.26945 |
| 13.70932 | −14.52039 |
| 13.21311 | −13.77945 |
| 12.70352 | −13.04764 |
| 12.18003 | −12.32572 |
| 11.64253 | −11.61416 |
| 11.09100 | −10.91342 |
| 10.52544 | −10.22396 |
| 9.94583 | −9.54626 |
| 9.35222 | −8.88079 |
| 8.74465 | −8.22805 |
| 8.12309 | −7.58861 |
| 7.48734 | −6.96328 |
| 6.83707 | −6.35307 |
| 6.17186 | −5.75919 |
| 5.49087 | −5.18346 |
| 4.79291 | −4.62845 |
| 4.07658 | −4.09737 |
| 3.34049 | −3.59405 |
| 2.58323 | −3.12321 |
| 1.80347 | −2.69068 |
| 1.00055 | −2.30289 |
| .17589 | −1.96379 |
| −.66758 | −1.67463 |
| −1.52662 | −1.43560 |
| −2.39793 | −1.24615 |
| −3.27839 | −1.10509 |
| −4.16503 | −1.01042 |
| −5.05526 | −.95917 |
| −5.94690 | −.94797 |
| −6.83826 | −.97327 |
| −7.72807 | −1.03173 |
| −8.61542 | −1.12006 |
| −9.49972 | −1.23498 |
| −10.38061 | −1.37374 |
| −10.81909 | −1.45147 |
| −12.03751 | −1.70015 |
| −13.24506 | −1.99721 |
| −14.45523 | −2.28302 |
| −15.69354 | −2.36776 |
| −16.61875 | −1.62286 |
| −16.59363 | −.38653 |
| −16.27093 | .81366 |
| −15.83725 | 1.97903 |
| −15.33560 | 3.11683 |
| −15.06219 | 3.67588 |
| −14.48077 | 4.77066 |
| −13.84130 | 5.83247 |

TABLE 1A-continued

TURBINE BLADE CONFIGURATION
LP rotor blade root, z value through Center of Gravity = 182.395 mm
Pitch = 21.8570 mm

| x (mm) | y (mm) |
|---|---|
| −13.12577 | 6.84449 |
| −12.32862 | 7.79350 |
| −11.44590 | 8.66329 |
| −10.47107 | 9.42821 |
| −9.40872 | 10.06585 |
| −8.26950 | 10.55268 |
| −7.07284 | 10.87348 |
| −5.84358 | 11.02828 |
| −4.60458 | 11.02080 |
| −3.37647 | 10.85636 |
| −2.17726 | 10.54434 |
| −1.01992 | 10.10129 |
| .08844 | 9.54677 |
| 1.14404 | 8.89729 |
| 2.14548 | 8.16697 |
| 3.09572 | 7.37106 |
| 4.00213 | 6.52550 |
| 4.87001 | 5.64040 |
| 5.69750 | 4.71746 |
| 6.48198 | 3.75768 |
| 7.22503 | 2.76546 |
| 7.93302 | 1.74790 |
| 8.61643 | .71364 |
| 9.28138 | −.33259 |
| 9.92709 | −1.39079 |
| 10.55346 | −2.46057 |
| 11.16347 | −3.53975 |
| 11.75964 | −4.62665 |
| 12.34035 | −5.72187 |
| 12.90289 | −6.82655 |
| 13.44681 | −7.94050 |
| 13.97353 | −9.06270 |
| 14.48786 | −10.19063 |
| 14.99371 | −11.32239 |
| 15.49228 | −12.45738 |
| 15.98338 | −13.59562 |
| 16.46669 | −14.73719 |
| 16.94254 | −15.88189 |
| 17.41146 | −17.02944 |
| 18.12630 | −18.81461 |
| 18.78810 | −20.50462 |
| 19.38766 | −22.06626 |
| 19.91580 | −23.46629 |
| 20.36333 | −24.67149 |
| 20.72108 | −25.64863 |
| 20.97984 | −26.36448 |
| 21.13044 | −26.78580 |

TABLE 1B

TURBINE BLADE CONFIGURATION
LP rotor blade mid-height, z value through Center of Gravity = 260.271 mm
Pitch = 30.9780 mm

| x (mm) | y (mm) |
|---|---|
| 15.54343 | −23.14048 |
| 15.57081 | −23.24924 |
| 15.56242 | −23.36107 |
| 15.51912 | −23.46453 |
| 15.44535 | −23.54899 |
| 15.34866 | −23.60582 |
| 15.23897 | −23.62919 |
| 15.12752 | −23.61670 |
| 15.02573 | −23.56963 |
| 14.94402 | −23.49281 |
| 14.91343 | −23.44560 |
| 14.56526 | −22.79345 |
| 14.22247 | −22.13846 |

TABLE 1B-continued

TURBINE BLADE CONFIGURATION
LP rotor blade mid-height, z value through Center of Gravity = 260.271 mm
Pitch = 30.9780 mm

| x (mm) | y (mm) |
|---|---|
| 13.88465 | −21.48088 |
| 13.55138 | −20.82099 |
| 13.22186 | −20.15921 |
| 12.89395 | −19.49664 |
| 12.56477 | −18.83470 |
| 12.23202 | −18.17455 |
| 11.89450 | −17.51682 |
| 11.55207 | −16.86163 |
| 11.20510 | −16.20884 |
| 10.85416 | −15.55818 |
| 10.49981 | −14.90936 |
| 10.14256 | −14.26213 |
| 9.78284 | −13.61628 |
| 9.42100 | −12.97161 |
| 9.05732 | −12.32797 |
| 8.69206 | −11.68524 |
| 8.32520 | −11.04341 |
| 7.95631 | −10.40275 |
| 7.58484 | −9.76358 |
| 7.21044 | −9.12612 |
| 6.83246 | −8.49079 |
| 6.44961 | −7.85837 |
| 6.06059 | −7.22973 |
| 5.66414 | −6.60575 |
| 5.25901 | −5.98737 |
| 4.84395 | −5.37562 |
| 4.41769 | −4.77162 |
| 3.97898 | −4.17661 |
| 3.52654 | −3.59196 |
| 3.05912 | −3.01923 |
| 2.57545 | −2.46016 |
| 2.07416 | −1.91685 |
| 1.55196 | −1.39363 |
| 1.00570 | −.89560 |
| .43432 | −.42662 |
| −.16158 | .01077 |
| −.78028 | .41528 |
| −1.41942 | .78668 |
| −2.07660 | 1.12516 |
| −2.75047 | 1.42904 |
| −3.43993 | 1.69568 |
| −4.14362 | 1.92210 |
| −4.85982 | 2.10513 |
| −5.58616 | 2.24267 |
| −6.31964 | 2.33472 |
| −7.05736 | 2.38200 |
| −7.79658 | 2.38576 |
| −8.16596 | 2.37184 |
| −9.14131 | 2.28667 |
| −10.10697 | 2.13872 |
| −11.06687 | 1.95645 |
| −12.03863 | 1.85081 |
| −12.75392 | 2.40987 |
| −12.61351 | 3.37379 |
| −12.18919 | 4.25336 |
| −11.65482 | 5.07097 |
| −11.03916 | 5.82926 |
| −10.70359 | 6.18507 |
| −10.01956 | 6.81638 |
| −9.28166 | 7.38377 |
| −8.49524 | 7.88170 |
| −7.66499 | 8.30245 |
| −6.79588 | 8.63542 |
| −5.89437 | 8.86639 |
| −4.97051 | 8.97716 |
| −4.04055 | 8.94989 |
| −3.12596 | 8.77930 |
| −2.24740 | 8.47295 |
| −1.41938 | 8.04830 |
| −.64718 | 7.52873 |
| .07117 | 6.93676 |
| .74049 | 6.28977 |

TABLE 1B-continued

TURBINE BLADE CONFIGURATION
LP rotor blade mid-height, z value through Center of Gravity = 260.271 mm
Pitch = 30.9780 mm

| x (mm) | y (mm) |
|---|---|
| 1.36635 | 5.60059 |
| 1.95414 | 4.87862 |
| 2.50866 | 4.13077 |
| 3.03412 | 3.36221 |
| 3.53416 | 2.57686 |
| 4.01197 | 1.77778 |
| 4.47040 | .96742 |
| 4.91206 | .14780 |
| 5.33951 | −.67933 |
| 5.75545 | −1.51230 |
| 6.16314 | −2.34935 |
| 6.56648 | −3.18851 |
| 6.96697 | −4.02902 |
| 7.36456 | −4.87092 |
| 7.76006 | −5.71379 |
| 8.15386 | −6.55747 |
| 8.54592 | −7.40195 |
| 8.93628 | −8.24722 |
| 9.32490 | −9.09330 |
| 9.71183 | −9.94014 |
| 10.09715 | −10.78772 |
| 10.48096 | −11.63599 |
| 10.86332 | −12.48490 |
| 11.24430 | −13.33444 |
| 11.62397 | −14.18457 |
| 12.00236 | −15.03527 |
| 12.37955 | −15.88650 |
| 12.75557 | −16.73825 |
| 13.13046 | −17.59049 |
| 13.50428 | −18.44321 |
| 13.87706 | −19.29638 |
| 14.24884 | −20.14998 |
| 14.61969 | −21.00399 |
| 14.98968 | −21.85837 |
| 15.35896 | −22.71306 |

TABLE 1C

TURBINE BLADE CONFIGURATION
LP rotor blade tip, z value through Centre of Gravity = 315.862 mm
Pitch = 35.5450 mm

| x (mm) | y (mm) |
|---|---|
| 10.67895 | −22.90184 |
| 10.70247 | −23.01203 |
| 10.68978 | −23.12398 |
| 10.64220 | −23.22612 |
| 10.56465 | −23.30785 |
| 10.46516 | −23.36074 |
| 10.35402 | −23.37930 |
| 10.24275 | −23.36161 |
| 10.14285 | −23.30950 |
| 10.06466 | −23.22837 |
| 10.03636 | −23.17945 |
| 9.71759 | −22.51273 |
| 9.40240 | −21.84432 |
| 9.09049 | −21.17437 |
| 8.78169 | −20.50299 |
| 8.47580 | −19.83027 |
| 8.17264 | −19.15632 |
| 7.87200 | −18.48124 |
| 7.57363 | −17.80515 |
| 7.27720 | −17.12821 |
| 6.98235 | −16.45058 |
| 6.68846 | −15.77253 |
| 6.39491 | −15.09434 |
| 6.10126 | −14.41618 |
| 5.80716 | −13.73823 |

TABLE 1C-continued

TURBINE BLADE CONFIGURATION
LP rotor blade tip, z value through Centre of Gravity = 315.862 mm
Pitch = 35.5450 mm

| x (mm) | y (mm) |
|---|---|
| 5.51233 | −13.06059 |
| 5.21652 | −12.38338 |
| 4.91952 | −11.70669 |
| 4.62114 | −11.03060 |
| 4.32122 | −10.35520 |
| 4.01958 | −9.68057 |
| 3.71607 | −9.00677 |
| 3.41053 | −8.33390 |
| 3.10281 | −7.66202 |
| 2.79274 | −6.99121 |
| 2.48016 | −6.32158 |
| 2.16491 | −5.65319 |
| 1.84680 | −4.98616 |
| 1.52566 | −4.32059 |
| 1.20128 | −3.65659 |
| .87345 | −2.99429 |
| .54193 | −2.33383 |
| .20648 | −1.67535 |
| −.13317 | −1.01903 |
| −.47733 | −.36507 |
| −.82633 | .28633 |
| −1.18055 | .93490 |
| −1.54038 | 1.58037 |
| −1.90631 | 2.22241 |
| −2.27886 | 2.86063 |
| −2.65863 | 3.49458 |
| −3.04632 | 4.12371 |
| −3.44274 | 4.74738 |
| −3.84881 | 5.36481 |
| −4.26567 | 5.97500 |
| −4.69454 | 6.57681 |
| −5.13670 | 7.16892 |
| −5.59328 | 7.74998 |
| −6.06499 | 8.31882 |
| −6.55152 | 8.87505 |
| −6.79978 | 9.14873 |
| −7.41070 | 9.80261 |
| −8.02268 | 10.45466 |
| −8.61511 | 11.12422 |
| −9.14010 | 11.84431 |
| −9.25668 | 12.68079 |
| −8.42477 | 12.95899 |
| −7.53543 | 12.88307 |
| −6.66615 | 12.67508 |
| −5.82520 | 12.37192 |
| −5.41850 | 12.18607 |
| −4.73374 | 11.79747 |
| −4.10050 | 11.32858 |
| −3.52498 | 10.79030 |
| −3.00629 | 10.19695 |
| −2.53879 | 9.56240 |
| −2.11467 | 8.89802 |
| −1.72581 | 8.21236 |
| −1.36489 | 7.51156 |
| −1.02565 | 6.80000 |
| −.70295 | 6.08079 |
| −.39261 | 5.35615 |
| −.09125 | 4.62772 |
| .20385 | 3.89674 |
| .49488 | 3.16412 |
| .78362 | 2.43060 |
| 1.07151 | 1.69675 |
| 1.35927 | .96284 |
| 1.64696 | .22891 |
| 1.93457 | −.50506 |
| 2.22211 | −1.23905 |
| 2.50958 | −1.97307 |
| 2.79697 | −2.70712 |
| 3.08427 | −3.44121 |
| 3.37147 | −4.17533 |
| 3.65855 | −4.90951 |
| 3.94549 | −5.64374 |
| 4.23231 | −6.37801 |

TABLE 1C-continued

TURBINE BLADE CONFIGURATION
LP rotor blade tip, z value through Centre of Gravity = 315.862 mm
Pitch = 35.5450 mm

| x (mm) | y (mm) |
|---|---|
| 4.51905 | −7.11231 |
| 4.80574 | −7.84664 |
| 5.09240 | −8.58098 |
| 5.37902 | −9.31533 |
| 5.66562 | −10.04969 |
| 5.95219 | −10.78406 |
| 6.23875 | −11.51843 |
| 6.52529 | −12.25282 |
| 6.81181 | −12.98721 |
| 7.09833 | −13.72160 |
| 7.38483 | −14.45600 |
| 7.67132 | −15.19040 |
| 7.95780 | −15.92481 |
| 8.24427 | −16.65922 |
| 8.53073 | −17.39363 |
| 8.81719 | −18.12805 |
| 9.10363 | −18.86247 |
| 9.39007 | −19.59689 |
| 9.67651 | −20.33132 |
| 9.96293 | −21.06575 |
| 10.24935 | −21.80018 |
| 10.53576 | −22.53461 |

TABLE 2A

TURBINE VANE CONFIGURATION
LP NGV root, z value through trailing edge = 202.26 mm
Pitch = 35.3010 mm

| x (mm) | y (mm) |
|---|---|
| −.01490 | .44610 |
| −.00261 | .33402 |
| −.02656 | .22384 |
| −.08428 | .12699 |
| −.16978 | .05350 |
| −.27421 | .01098 |
| −.38673 | .00384 |
| −.49569 | .03283 |
| −.58979 | .09493 |
| −.65928 | .18372 |
| −.68243 | .23533 |
| −.94294 | .96264 |
| −1.20723 | 1.68858 |
| −1.47583 | 2.41294 |
| −1.74893 | 3.13562 |
| −2.02657 | 3.85657 |
| −2.30877 | 4.57574 |
| −2.59550 | 5.29311 |
| −2.88675 | 6.00867 |
| −3.18245 | 6.72240 |
| −3.48251 | 7.43430 |
| −3.78683 | 8.14440 |
| −4.09532 | 8.85269 |
| −4.40777 | 9.55925 |
| −4.72398 | 10.26413 |
| −5.04384 | 10.96736 |
| −5.36753 | 11.66883 |
| −5.69532 | 12.36840 |
| −6.02742 | 13.06594 |
| −6.36425 | 13.76120 |
| −6.70738 | 14.45337 |
| −7.05737 | 15.14211 |
| −7.41413 | 15.82735 |
| −7.77936 | 16.50812 |
| −8.15461 | 17.18341 |
| −8.54147 | 17.85212 |
| −8.94162 | 18.51296 |
| −9.35698 | 19.16434 |
| −9.78955 | 19.80440 |

TABLE 2A-continued

TURBINE VANE CONFIGURATION
LP NGV root, z value through trailing edge = 202.26 mm
Pitch = 35.3010 mm

| x (mm) | y (mm) |
| --- | --- |
| −10.24129 | 20.43108 |
| −10.71394 | 21.04214 |
| −11.20887 | 21.63528 |
| −11.72709 | 22.20818 |
| −12.26919 | 22.75852 |
| −12.83544 | 23.28398 |
| −13.42586 | 23.78211 |
| −14.04021 | 24.25039 |
| −14.67795 | 24.68628 |
| −15.33818 | 25.08727 |
| −16.01963 | 25.45103 |
| −16.72063 | 25.77549 |
| −17.43919 | 26.05896 |
| −18.17303 | 26.30012 |
| −18.91967 | 26.49815 |
| −19.67650 | 26.65267 |
| −20.44093 | 26.76379 |
| −21.21038 | 26.83187 |
| −21.98243 | 26.85681 |
| −22.75469 | 26.83884 |
| −23.52482 | 26.77880 |
| −23.90841 | 26.73342 |
| −25.01024 | 26.54700 |
| −26.09717 | 26.28713 |
| −27.17273 | 25.98307 |
| −28.26154 | 25.73704 |
| −29.12868 | 26.25707 |
| −29.24704 | 27.36472 |
| −29.17288 | 28.47927 |
| −28.98650 | 29.58102 |
| −28.72074 | 30.66649 |
| −28.56113 | 31.20206 |
| −28.15147 | 32.36087 |
| −27.65824 | 33.48663 |
| −27.08019 | 34.57124 |
| −26.41747 | 35.60627 |
| −25.67021 | 36.58196 |
| −24.83845 | 37.48661 |
| −23.92189 | 38.30508 |
| −22.92485 | 39.02330 |
| −21.85687 | 39.63088 |
| −20.72259 | 40.10247 |
| −19.53125 | 40.40029 |
| −18.30676 | 40.48939 |
| −17.08548 | 40.36258 |
| −15.90222 | 40.03416 |
| −14.78581 | 39.52237 |
| −13.75865 | 38.84887 |
| −12.83321 | 38.04093 |
| −12.01221 | 37.12678 |
| −11.29108 | 36.13174 |
| −10.66066 | 35.07672 |
| −10.10958 | 33.97805 |
| −9.62359 | 32.84899 |
| −9.18949 | 31.69889 |
| −8.77856 | 30.54027 |
| −8.38163 | 29.37676 |
| −7.99656 | 28.20928 |
| −7.62073 | 27.03878 |
| −7.24999 | 25.86666 |
| −6.88423 | 24.69298 |
| −6.52467 | 23.51739 |
| −6.17232 | 22.33961 |
| −5.82590 | 21.16008 |
| −5.48625 | 19.97858 |
| −5.15101 | 18.79582 |
| −4.81699 | 17.61271 |
| −4.48367 | 16.42941 |
| −4.15119 | 15.24587 |
| −3.81946 | 14.06212 |
| −3.48815 | 12.87825 |
| −3.15700 | 11.69434 |
| −2.82591 | 10.51041 |

TABLE 2A-continued

TURBINE VANE CONFIGURATION
LP NGV root, z value through trailing edge = 202.26 mm
Pitch = 35.3010 mm

| x (mm) | y (mm) |
| --- | --- |
| −2.49487 | 9.32646 |
| −2.16387 | 8.14251 |
| −1.83291 | 6.95854 |
| −1.50197 | 5.77457 |
| −1.17113 | 4.59057 |
| −.84025 | 3.40658 |
| −.50929 | 2.22262 |
| −.17946 | 1.03833 |

TABLE 2B

TURBINE VANE CONFIGURATION
LP NGV mid-height, z value through trailing edge = 252.09 mm
Pitch = 44.1320 mm

| x (mm) | y (mm) |
| --- | --- |
| 88.23344 | −8.32138 |
| 88.25297 | −8.43178 |
| 88.23661 | −8.54269 |
| 88.18604 | −8.64275 |
| 88.10644 | −8.72171 |
| 88.00597 | −8.77146 |
| 87.89493 | −8.78692 |
| 87.78469 | −8.76650 |
| 87.68655 | −8.71228 |
| 87.61058 | −8.62984 |
| 87.58345 | −8.58058 |
| 87.18756 | −7.70699 |
| 86.78859 | −6.83481 |
| 86.38588 | −5.96434 |
| 85.97919 | −5.09573 |
| 85.56843 | −4.22904 |
| 85.15356 | −3.36431 |
| 84.73457 | −2.50156 |
| 84.31148 | −1.64082 |
| 83.88431 | −.78210 |
| 83.45314 | .07463 |
| 83.01806 | .92937 |
| 82.57915 | 1.78215 |
| 82.13657 | 2.63304 |
| 81.69055 | 3.48212 |
| 81.24124 | 4.32947 |
| 80.78855 | 5.17502 |
| 80.33215 | 6.01857 |
| 79.87175 | 6.85995 |
| 79.40702 | 7.69894 |
| 78.93702 | 8.53499 |
| 78.45959 | 9.36681 |
| 77.97548 | 10.19477 |
| 77.48342 | 11.01803 |
| 76.98153 | 11.83533 |
| 76.46802 | 12.64538 |
| 75.94102 | 13.44671 |
| 75.39851 | 14.23762 |
| 74.83822 | 15.01603 |
| 74.25787 | 15.77960 |
| 73.65523 | 16.52569 |
| 73.02841 | 17.25158 |
| 72.37591 | 17.95446 |
| 71.69667 | 18.63153 |
| 70.99009 | 19.28001 |
| 70.25595 | 19.89710 |
| 69.49428 | 20.47987 |
| 68.70545 | 21.02530 |
| 67.89019 | 21.53035 |
| 67.04964 | 21.99207 |
| 66.18537 | 22.40770 |
| 65.29940 | 22.77481 |
| 64.39416 | 23.09141 |

TABLE 2B-continued

TURBINE VANE CONFIGURATION
LP NGV mid-height, z value through trailing edge = 252.09 mm
Pitch = 44.1320 mm

| x (mm) | y (mm) |
|---|---|
| 63.47237 | 23.35599 |
| 62.53700 | 23.56761 |
| 61.59114 | 23.72588 |
| 60.63789 | 23.83079 |
| 59.68024 | 23.88185 |
| 58.72123 | 23.87888 |
| 57.76386 | 23.82277 |
| 57.28665 | 23.77538 |
| 55.94301 | 23.57552 |
| 54.61554 | 23.29083 |
| 53.30197 | 22.94801 |
| 51.98800 | 22.61765 |
| 50.69273 | 22.76907 |
| 50.53220 | 24.08576 |
| 50.85221 | 25.40248 |
| 51.34516 | 26.66701 |
| 51.95042 | 27.88212 |
| 52.28808 | 28.47112 |
| 53.03444 | 29.61919 |
| 53.87086 | 30.70442 |
| 54.79321 | 31.71761 |
| 55.79647 | 32.65076 |
| 56.87542 | 33.49520 |
| 58.02442 | 34.24150 |
| 59.23762 | 34.87801 |
| 60.50753 | 35.39206 |
| 61.82197 | 35.77839 |
| 63.16847 | 36.03085 |
| 64.53478 | 36.12842 |
| 65.90182 | 36.04512 |
| 67.24175 | 35.76226 |
| 68.52547 | 35.28503 |
| 69.73139 | 34.63559 |
| 70.84445 | 33.83722 |
| 71.85441 | 32.91174 |
| 72.75762 | 31.88165 |
| 73.55753 | 30.76931 |
| 74.26221 | 29.59422 |
| 74.88586 | 28.37405 |
| 75.46150 | 27.13042 |
| 76.00103 | 25.87068 |
| 76.51199 | 24.59908 |
| 77.00325 | 23.31972 |
| 77.48656 | 22.03734 |
| 77.96418 | 20.75282 |
| 78.43684 | 19.46647 |
| 78.90664 | 18.17907 |
| 79.37428 | 16.89089 |
| 79.83939 | 15.60179 |
| 80.30126 | 14.31153 |
| 80.76046 | 13.02031 |
| 81.21668 | 11.72804 |
| 81.67089 | 10.43506 |
| 82.12457 | 9.14190 |
| 82.57793 | 7.84862 |
| 83.03092 | 6.55521 |
| 83.48360 | 5.26170 |
| 83.93614 | 3.96813 |
| 84.38864 | 2.67455 |
| 84.84111 | 1.38096 |
| 85.29356 | .08736 |
| 85.74599 | −1.20624 |
| 86.19841 | −2.49985 |
| 86.65080 | −3.79346 |
| 87.10318 | −5.08709 |
| 87.55561 | −6.38069 |
| 88.00761 | −7.67444 |

TABLE 2C

TURBINE VANE CONFIGURATION
LP NGV tip, z value through trailing edge = 297.87 mm
Pitch = 52.2460 mm

| x (mm) | y (mm) |
|---|---|
| 93.38961 | −16.42509 |
| 93.39896 | −16.53681 |
| 93.37252 | −16.64577 |
| 93.31302 | −16.74078 |
| 93.22654 | −16.81213 |
| 93.12194 | −16.85249 |
| 93.00995 | −16.85773 |
| 92.90204 | −16.82732 |
| 92.80927 | −16.76436 |
| 92.74115 | −16.67531 |
| 92.71864 | −16.62378 |
| 92.31154 | −15.45170 |
| 91.89931 | −14.28141 |
| 91.48104 | −13.11328 |
| 91.05635 | −11.94746 |
| 90.62508 | −10.78406 |
| 90.18712 | −9.62316 |
| 89.74243 | −8.46482 |
| 89.29096 | −7.30911 |
| 88.83270 | −6.15607 |
| 88.36769 | −5.00574 |
| 87.89599 | −3.85814 |
| 87.41767 | −2.71328 |
| 86.93283 | −1.57116 |
| 86.44171 | −.43173 |
| 85.94449 | .70505 |
| 85.44113 | 1.83912 |
| 84.93115 | 2.97023 |
| 84.41412 | 4.09814 |
| 83.88962 | 5.22259 |
| 83.35682 | 6.34314 |
| 82.81304 | 7.45839 |
| 82.25783 | 8.56800 |
| 81.69107 | 9.67175 |
| 81.11015 | 10.76812 |
| 80.51272 | 11.85557 |
| 79.89637 | 12.93240 |
| 79.25852 | 13.99664 |
| 78.59633 | 15.04590 |
| 77.90671 | 16.07733 |
| 77.18663 | 17.08772 |
| 76.43329 | 18.07355 |
| 75.64435 | 19.03112 |
| 74.81802 | 19.95659 |
| 73.95310 | 20.84611 |
| 73.04901 | 21.69576 |
| 72.10556 | 22.50147 |
| 71.12301 | 23.25899 |
| 70.10208 | 23.96391 |
| 69.04408 | 24.61187 |
| 67.95096 | 25.19861 |
| 66.82532 | 25.72023 |
| 65.67041 | 26.17335 |
| 64.49002 | 26.55523 |
| 63.28842 | 26.86390 |
| 62.07011 | 27.09809 |
| 60.83960 | 27.25611 |
| 59.60158 | 27.33630 |
| 58.36097 | 27.33857 |
| 57.12255 | 27.26458 |
| 56.50665 | 27.20019 |
| 54.83786 | 26.93825 |
| 53.18968 | 26.56760 |
| 51.55889 | 26.12580 |
| 49.91967 | 25.71261 |
| 48.53676 | 26.37267 |
| 48.74377 | 28.05033 |
| 49.35558 | 29.62371 |
| 50.17083 | 31.10267 |
| 51.13227 | 32.49134 |
| 51.66102 | 33.15157 |
| 52.78603 | 34.37695 |
| 54.01773 | 35.49498 |

TABLE 2C-continued

TURBINE VANE CONFIGURATION
LP NGV tip, z value through trailing edge = 297.87 mm
Pitch = 52.2460 mm

| x (mm) | y (mm) |
|---|---|
| 55.34851 | 36.49300 |
| 56.76681 | 37.36217 |
| 58.26020 | 38.09485 |
| 59.81589 | 38.68379 |
| 61.42084 | 39.12089 |
| 63.06102 | 39.39775 |
| 64.72046 | 39.51280 |
| 66.38343 | 39.47282 |
| 68.03519 | 39.27629 |
| 69.65813 | 38.91210 |
| 71.23058 | 38.37018 |
| 72.72839 | 37.64724 |
| 74.13232 | 36.75540 |
| 75.43281 | 35.71837 |
| 76.62549 | 34.55881 |
| 77.71180 | 33.29892 |
| 78.69776 | 31.95895 |
| 79.59198 | 30.55600 |
| 80.40411 | 29.10393 |
| 81.14386 | 27.61363 |
| 81.82047 | 26.09361 |
| 82.44251 | 24.55042 |
| 83.01781 | 22.98918 |
| 83.55351 | 21.41391 |
| 84.05623 | 19.82779 |
| 84.53212 | 18.23341 |
| 84.98709 | 16.63293 |
| 85.42692 | 15.02823 |
| 85.85747 | 13.42100 |
| 86.28322 | 11.81249 |
| 86.70348 | 10.20255 |
| 87.11891 | 8.59135 |
| 87.52921 | 6.97883 |
| 87.93588 | 5.36540 |
| 88.34160 | 3.75172 |
| 88.74676 | 2.13791 |
| 89.15127 | .52393 |
| 89.55533 | −1.09016 |
| 89.95919 | −2.70430 |
| 90.36300 | −4.31845 |
| 90.76678 | −5.93261 |
| 91.17051 | −7.54678 |
| 91.57422 | −9.16096 |
| 91.97790 | −10.77515 |
| 92.38153 | −12.38935 |
| 92.78527 | −14.00352 |
| 93.18836 | −15.61785 |

TABLE 3

TURBINE NOZZLE CONFIGURATION

| Station | x-hub (m) | r-hub (m) | x-tip (m) | r-tip (m) |
|---|---|---|---|---|
| 001 | −0.06940 | 0.22767 | −0.06940 | 0.28448 |
| 002 | −0.04640 | 0.22665 | −0.04640 | 0.26645 |
| 003 | −0.03070 | 0.22502 | −0.03070 | 0.26066 |
| 004 | −0.01500 | 0.22340 | −0.01500 | 0.25905 |
| 005 | 0.00930 | 0.22088 | 0.00930 | 0.26227 |
| 006 | 0.01213 | 0.22059 | 0.01493 | 0.26316 |
| 007 | 0.01661 | 0.22012 | 0.01949 | 0.26388 |
| 008 | 0.04097 | 0.2176 | 0.03668 | 0.26660 |
| 009 | 0.04786 | 0.21513 | 0.04219 | 0.26978 |
| 010 | 0.05450 | 0.21275 | 0.04851 | 0.27343 |
| 011 | 0.08374 | 0.20226 | 0.09340 | 0.29935 |
| 012 | 0.09088 | 0.19970 | 0.10060 | 0.3035 |
| 013 | 0.09801 | 0.19714 | 0.10780 | 0.30766 |

TABLE 3-continued

TURBINE NOZZLE CONFIGURATION

| Station | x-hub (m) | r-hub (m) | x-tip (m) | r-tip (m) |
|---|---|---|---|---|
| 014 | 0.13361 | 0.18437 | 0.12346 | 0.31670 |
| 015 | 0.17361 | 0.18500 | 0.17361 | 0.32750 |

TABLE 4

EXHAUST SECTION CONFIGURATION

| Xlip (mm) | Rlip (mm) | Xhub (mm) | Rhub (mm) | xlip, corr (mm) | xhub, corr (mm) |
|---|---|---|---|---|---|
| 0 | 316.700 | 24.2129 | 186.604 | 123.460 | 147.672 |
| 54.0240 | 328.809 | 89.0317 | 195.604 | 177.484 | 212.491 |
| 80.6632 | 336.860 | 127.0400 | 201.455 | 204.123 | 250.500 |
| 98.6562 | 343.766 | 156.9010 | 207.137 | 222.116 | 280.361 |
| 112.0720 | 350.073 | 182.6000 | 213.257 | 235.532 | 306.060 |
| 122.5720 | 355.981 | 205.7060 | 220.066 | 246.032 | 329.166 |
| 131.0170 | 361.580 | 226.9870 | 227.702 | 254.477 | 350.447 |
| 137.9190 | 366.919 | 246.8530 | 236.249 | 261.379 | 370.313 |
| 143.6080 | 372.025 | 265.5320 | 245.763 | 267.068 | 388.992 |
| 148.3160 | 376.915 | 283.1460 | 256.281 | 271.776 | 406.606 |
| 152.2090 | 381.600 | 299.7520 | 267.822 | 275.669 | 423.212 |
| 155.4150 | 386.086 | 315.3670 | 280.395 | 278.875 | 438.827 |
| 158.0320 | 390.380 | 329.9750 | 293.994 | 281.492 | 453.435 |
| 160.1400 | 394.485 | 343.5430 | 308.605 | 283.600 | 467.003 |
| 161.8040 | 398.404 | 356.0240 | 324.200 | 285.264 | 479.484 |
| 163.0770 | 402.140 | 367.3620 | 340.743 | 286.537 | 490.822 |
| 164.0060 | 405.697 | 377.4040 | 358.188 | 287.466 | 500.954 |
| 164.6300 | 409.077 | 386.3560 | 376.478 | 288.090 | 509.816 |
| 164.9820 | 412.282 | 393.8790 | 395.545 | 288.442 | 517.339 |
| 165.0930 | 415.317 | 400.0000 | 415.316 | 288.553 | 523.460 |

I claim:

1. An axial flow gas turbine, comprising: in axial succession, a turbine and a turbine exhaust section, the turbine comprising a turbine nozzle containing a low pressure turbine stage having an annular row of stator vanes followed in axial succession by an annular row of rotor blades, wherein the low pressure turbine stage is characterized by the following parameters:

a ratio of vane airfoil pitch to vane airfoil axial width at a root end of a vane airfoil (P/W) is in a region of 1.0 to 1.2;

a ratio of blade airfoil pitch to blade airfoil axial width at a root end of a blade airfoil (P/W) is in the region of 0.6;

a ratio of blade diameter at a tip end of the blade airfoil to blade diameter at the root end of the blade airfoil is in a region of 1.6–1.8; and a ratio of a axial length of the exhaust section to the blade airfoil height (L/H) is no greater than a value in a region of 4:1;

said parameters being subject to a predetermined amount of variation.

2. The gas turbine according to claim 1, wherein the blade airfoils taper so as to have a smaller axial width at their tips than at their root ends.

3. The gas turbine according to claim 1, wherein the vane airfoils taper so as to have a larger axial width at their tips than at their root ends.

4. The gas turbine according to claim 1, wherein said ratio of vane airfoil pitch to vane airfoil axial width at the root end of the vane airfoil (P/W) is about 1.12.

5. The gas turbine according to claim 1, wherein said ratio of blade diameter at the tip end of the blade airfoil to blade diameter at the root end of the blade airfoil is about 1.72.

6. The gas turbine according to claim 1, wherein said ratio of the axial length of the exhaust section to the blade airfoil height (L/H) is about 3:1.

7. The gas turbine according to claim 1, wherein the blade airfoil configuration is as defined in Tables 1A to 1C, subject to said predetermined level of variation.

8. The gas turbine according to claim 1, wherein the blade airfoil configuration is defined by the application of a scaling factor to the x, y and z values in Tables 1A to 1C to obtain scaled x, y and z values, said scaling factor being chosen to obtain a predetermined power output from the low pressure turbine, the scaled x, y and z values being subject to said predetermined level of variation.

9. The gas turbine according to claim 8, wherein the shape of said exhaust section is as defined in Table 4, and the dimensions of said exhaust section are commensurate with the scaled x, y and z values of the blade airfoil.

10. The gas turbine according to claim 1, wherein the vane airfoil configuration is as defined in Tables 2A to 2C, subject to said predetermined level of variation.

11. The gas turbine according to claim 1, wherein the vane airfoil configuration is defined by the application of a scaling factor to the x, y and z values defined in Tables 2A to 2C to obtain scaled x, y and z values, said scaling factor being chosen to obtain a predetermined power output from the low pressure turbine, the scaled x, y and z values being subject to said predetermined level of variation.

12. The gas turbine according to claim 1, wherein the blade airfoil's configuration and the vane airfoil's configuration are defined by the application of a scaling factor to the x, y and z values defined in Tables 1A to 1C and Tables 2A to 2C respectively, thereby to obtain scaled x, y and z values, said scaling factor being chosen to obtain a predetermined power output from the low pressure turbine, the scaled x, y and z values being subject to said predetermined level of variation.

13. The gas turbine according to claim 1, wherein the configuration of said turbine nozzle is as defined in Table 3, subject to said predetermined level of variation.

14. The gas turbine according to claim 11, wherein the shape of said turbine nozzle is as defined in Table 3, and the dimensions of said turbine nozzle are commensurate with the scaled x, y and z values of the blade and vane airfoils.

15. The gas turbine according to claim 1, wherein the configuration of the exhaust section is as defined in Table 4, subject to said predetermined level of variation.

16. The gas turbine according to claim 1, wherein said predetermined level of variation is up to ±10%.

17. The gas turbine according to claim 16, wherein said predetermined level of variation is up to ±5%.

18. A blade airfoil for a low pressure turbine stage of a gas turbine, the airfoil having cross-sectional profiles at a root, mid-height, and tip as defined in Tables 1A to 1C respectively, subject to a predetermined level of variation.

19. The blade airfoil according to claim 18, wherein said predetermined level of variation is up to ±10%.

20. The blade airfoil according to claim 19, wherein said predetermined level of variation is up to ±5%.

21. A blade airfoil for a low pressure turbine stage of a gas turbine, the blade airfoil's configuration being defined by the application of a scaling factor to the x, y and z values in Tables 1A to 1C to obtain scaled x, y and z values, said scaling factor being chosen to obtain a predetermined power output from the low pressure turbine, the scaled x, y and z values being subject to said predetermined level of variation.

22. A vane airfoil for a low pressure turbine stage of a gas turbine, the vane having cross-sectional profiles at a root, mid-height, and tip as defined in Tables 2A to 2C respectively, subject to a predetermined level of variation.

23. The vane airfoil according to claim 22, wherein said predetermined level of variation is up to ±10%.

24. The vane airfoil according to claim 23, wherein said predetermined level of variation is up to ±5%.

25. A vane airfoil for a low pressure turbine stage of a gas turbine, the vane airfoil's configuration being defined by the application of a scaling factor to the x, y and z values in Tables 2A to 2C to obtain scaled x, y and z values, said scaling factor being chosen to obtain a predetermined power output from the low pressure turbine, the scaled x, y and z values being subject to said predetermined level of variation.

* * * * *